United States Patent [19]
Miyashita et al.

[11] Patent Number: 5,609,486
[45] Date of Patent: Mar. 11, 1997

[54] KARAOKE REPRODUCING APPARATUS

[75] Inventors: Masahiko Miyashita, Tokorozawa; Tatsuyuki Miyazawa; Hiroshi Fujii, both of Tokyo; Yoshihiro Kitano, Tokorozawa, all of Japan

[73] Assignee: Pioneer Electronic Corporation, Tokyo, Japan

[21] Appl. No.: 314,961

[22] Filed: Sep. 29, 1994

[30] Foreign Application Priority Data

Oct. 1, 1993 [JP] Japan .................................. 5-246988

[51] Int. Cl.⁶ .............................. G09B 5/08; G10H 1/36
[52] U.S. Cl. ...................... 434/307 A; 434/318; 84/609; 84/610; 84/477 R; 386/105
[58] Field of Search ................................ 434/307 R–309, 434/318, 365; 84/477 R, 601, 603, 609, 610, 625, 630, 631, 634, 645; 369/2, 48, 178, 192; 360/32, 33.01, 49, 70, 77.01; 358/335, 342; 395/2.79, 154, 160, 141, 143, 147; 348/478, 488, 571; 381/51

[56] References Cited

U.S. PATENT DOCUMENTS

| 5,046,004 | 9/1991 | Tsumura et al. ........................ 84/601 X |
| 5,194,683 | 3/1993 | Tsumura et al. ...................... 434/307 A |
| 5,247,126 | 9/1993 | Okamura et al. ................. 84/477 R X |
| 5,250,747 | 10/1993 | Tsumura ............................... 434/307 A |
| 5,286,907 | 2/1994 | Okamura et al. ...................... 84/645 X |
| 5,397,853 | 3/1995 | Koguchi ............................... 434/307 A |

FOREIGN PATENT DOCUMENTS

| 0303700 | 2/1989 | European Pat. Off. . |
| 3253889 | 11/1991 | Japan . |
| 4280096 | 10/1992 | Japan . |
| 4344698 | 12/1992 | Japan . |
| 5153586 | 6/1993 | Japan . |
| 5224684 | 9/1993 | Japan . |

*Primary Examiner*—Joe Cheng
*Attorney, Agent, or Firm*—Perman & Green

[57] ABSTRACT

A Karaoke apparatus in which after one Karaoke play was finished, a show-up effect according to the next Karaoke playing music piece is obtained for a period of time until the start of the next Karaoke play. Control information of a plurality of music pieces is previously reproduced by the reproducing means from the recorded information on a recording medium and is stored in memory. When one of the plurality of music pieces is selected by an operation, the control information corresponding to the selected music piece is read out from the memory and is supplied to the external apparatus to thereby start the operation. After that, the recording medium is played with regard to the selected music piece, thereby starting the reproduction of the Karaoke playing sound. Before the next Karaoke playing sound is generated, the external apparatus starts the operation according to the next Karaoke playing sound, so that the image of the selected music piece to be subsequently played is expressed by the external apparatus.

3 Claims, 9 Drawing Sheets

| PLAYING ORDER | MUSIC PIECE SELECTION NUMBER |
|---|---|
| 1 | 7 6 0 4 |
| 2 | 1 2 1 0 |
| 3 | 3 4 0 6 |
| 4 | 5 4 1 2 |
| ⋮ | ⋮ |

FIG. 9

| BIT NO. | CONTROL APPARATUS |
|---|---|
| 15 | ILLUMINATING APPARATUS |
| 14 | BACKGROUND VIDEO IMAGE APPARATUS (INCLUDING VIDEO CAMERA CONTROL) |
| 13 | SMOKING APPARATUS |
| 12 | SOAP BUBBLE GENERATING APPARATUS |
| 11 | AUDIO PROCESSING APPARATUS |
| 10 ~ 0 | UNDEFINED |

FIG.10

KARAOKE REPRODUCING APPARATUS

BACKGROUND OF THE INVENTION

1. Field of the Invention

The present invention relates to a Karaoke reproducing apparatus using a recording medium on which Karaoke playing sounds of a plurality of music pieces are recorded and reproducing the playing sound of the selected one of the plurality of music pieces.

2. Description of Background Information

In conventional Karaoke reproducing apparatuses, external apparatuses such as illuminating apparatus, background video image apparatus, or the like for presenting a singing environment are used, and the control of those apparatuses are performed in correspondence to a Karaoke playing sound obtained by playing a recording medium. For instance, in the case of the illuminating apparatus, the color and illuminance of the illumination change in accordance with the Karaoke playing music piece. In the case of the background video image apparatus, the background video image of a word video image of the playing music piece that is displayed on a display has the contents corresponding to the contents of the playing music piece. The term "external apparatus" is a general denomination of apparatuses other than the apparatus for playing the Karaoke sound.

However, in conventional Karaoke reproducing apparatuses designed to control the external apparatus in accordance with the play of the Karaoke as mentioned above, the external apparatus doesn't start the operation so long as real-time data is not generated in accordance with the play of the recording medium. After the Karaoke play of one music piece was finished, therefore, it takes an access time including the exchange of the recording medium for the next Karaoke playing music piece. A silent state continues and a blank state appears until the start of the next Karaoke play and the next Karaoke play is suddenly started. A show-up effect such as to incite a pre-boom, therefore, cannot be obtained.

OBJECT AND SUMMARY OF THE INVENTION

It is, therefore, an object of the invention to provide a Karaoke reproducing apparatus in which after one Karaoke play was finished, a show-up effect adapted to the next Karaoke playing music piece can be obtained for a period of time until the start of the next Karaoke play.

According to the present invention, the above object is accomplished by a Karaoke reproducing apparatus which can reproduce a Karaoke playing sound and can control an external apparatus, wherein the apparatus comprises: a recording medium on which at least Karaoke playing sounds of a plurality of music pieces and control information of an external apparatus of each of the plurality of music pieces have been recorded; reproducing means for reading out the recorded information from the recording medium and for reproducing; memory means for causing the reproducing means to reproduce the control information of the plurality of music pieces and for storing the control information; means for generating a music piece selection command indicative of one of the plurality of music pieces in accordance with an operation; and control means for reading out the control information of the one music piece corresponding to the music piece selection command from the memory means and for supplying the control information to the external apparatus and, after that, for instructing the reproducing means to play the recording medium with respect to the one music piece corresponding to the music piece selection command.

According to the Karaoke reproducing apparatus of the invention, the control information of a plurality of music pieces are previously reproduced from the recorded information on the recording medium by the reproducing means and is stored into the memory means. When one of the plurality of music pieces is selected by the operation, the control information corresponding to the selected music piece is read out from the memory means and is supplied to the external apparatus to thereby start the operation. After that, the recording medium is played with respect to the selected music piece, thereby starting the reproduction of the Karaoke playing sound.

DETAILED DESCRIPTION OF THE PREFERRED EMBODIMENT

An embodiment of the present invention will now be described in detail hereinbelow with reference to the drawings.

Figure 1:
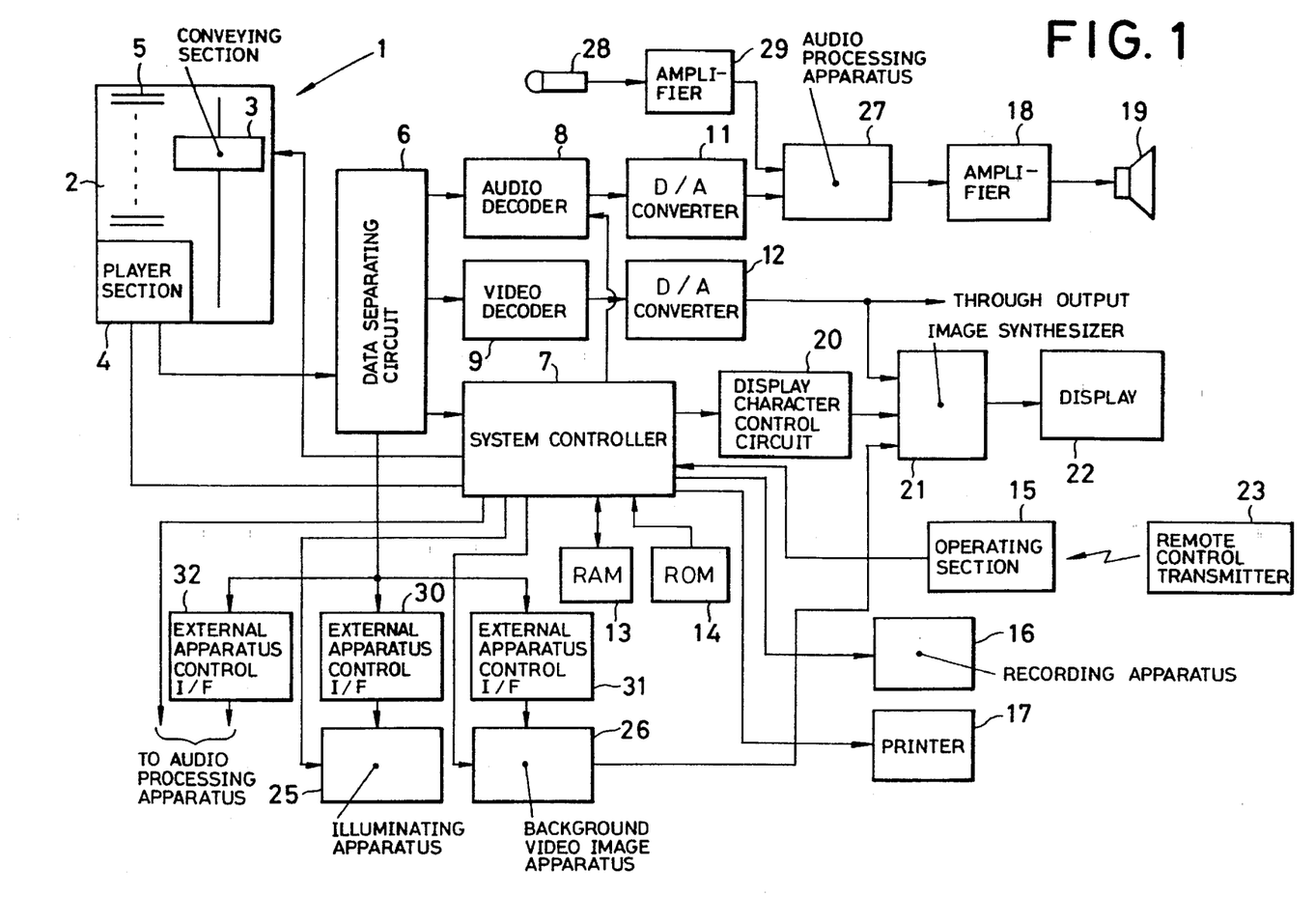
FIG. 1 is a block diagram showing an embodiment of the present invention.

In a Karaoke reproducing apparatus shown in FIG. 1, a disc enclosing section 2, a disc conveying section 3, and a player section 4 are provided in an automatic changer 1. A plurality of discs 5 are enclosed in the disc enclosing section 2. When a disc is played, one of the plurality of discs 5 is conveyed onto a turntable (not shown) of the player section 4 by the conveying section 3. When the play is finished, the disc on the turntable is returned to a predetermined position of the disc enclosing section 2 by the conveying section 3. The player section 4 plays the disc on the turntable and generates read data. The disc conveying section 3 and player section 4 operate in response to a command from a system controller 7, which will be explained hereinbelow.

A data separating circuit 6 is connected to a data output of the player section 4. The data separating circuit 6 separates the data generated from the player section 4 to various data such as compressive image data, compressive audio data, real-time data, control data, information data, etc. and generates those data from individual output terminals. In addition to the above system controller 7, an audio decoder 8 and a video decoder 9 are connected to the data separating circuit 6. Terminals to connect the external apparatuses are provided for the data separating circuit 6. In the apparatus, an illuminating apparatus 25, a background video image apparatus 26 including a video camera and a recording medium playing apparatus, and an audio processing apparatus 27 comprising a DSP (Digital Signal Processor) are provided as external apparatuses. Those apparatuses are used for Karaoke presentation. The illuminating apparatus 25 is used to control the illuminance in what is called a Karaoke room. As a background video image of character information such as words or the like which is displayed on a display 22, the background video image apparatus 26 is used to display, for example, not only a photography video image of a singer or the like photographed by using a video camera but also a video image according to the image, situation, location, or seasons of the music piece by the playing operation of the recording medium playing apparatus. The background video image apparatus 26 generates a background video image signal indicative of the background video image. The audio processing apparatus 27 is used to control a sound field in the Karaoke room due to the Karaoke sound or singing sound and is arranged in an audio reproducing system as will be explained below.

External apparatus control interfaces 30 to 32 each having a function to convert the real-time data are provided between the data separating circuit 6 and the illuminating apparatus 25, background video image apparatus 26, and audio processing apparatus 27. For example, each of the interfaces 30 to 32 are constructed by a microcomputer and, further, has an internal memory (not shown) in which a conversion table has previously been written in a partial area. The conversion table differs in dependence on the external apparatus that is connected.

The audio decoder 8 decodes the separated compressive audio data and reconstructs as non-compressive audio data such as PCM digital data or the like. Since the audio data of a plurality of channels has been compressed in the compressive audio data, the audio data of the channel designated in response to the signal from the system controller 7 is reconstructed. The audio data generated from the audio decoder 8 is supplied to a D/A converter 11 and is converted into the analog audio signal. The analog audio signal is supplied to a speaker 19 through the audio processing apparatus 27 and an amplifier 18. An output signal of a microphone 28 for singing is also supplied to the audio processing apparatus 27 through an amplifier 29.

The video decoder 9 decodes the separated compressive image data and reconstructs as non-compressive image data. The image data generated from the video decoder 9 is supplied to a D/A converter 12 and is converted into the analog moving image video signal. The moving image video signal is directly generated as a through output and is also supplied to an image synthesizer 21.

The system controller 7 is constructed by a microcomputer and receives the separated information data. The information data is stored into an RAM (random access memory) 13 and is selectively read out from the RAM 13. The read-out information data is processed in the system controller 7 or is supplied to a display character control circuit 20. The display character control circuit 20 has a character generator and a V-RAM and produces the display character data according to the information data and writes it into the V-RAM. The control circuit 20 reads out the display character data from the V-RAM synchronously with a sync signal of the moving image video signal and converts into the character video image signal and supplies to the image synthesizer 21. The character video image signal is synthesized to the moving image video signal from the D/A converter 12 or to the background video image signal from the background video image apparatus 26 by the image synthesizer 21.

An operating section 15, a recording apparatus 16, and a printer 17 are connected to the system controller 7. The operating section 15 has a keyboard to designate a music piece to be played and a receiving section (not shown) to accept the designation of the playing music piece from a remote control transmitter 23. The recording apparatus 16 is used to record a playing sound or a singing sound of Karaoke to a recordable compact disc (not shown) such as a CD-R or the like. An audio signal indicative of the playing sound and singing sound is supplied from the amplifier 18 to the recording apparatus 16. The printer 17 is used to print recording music piece information such as a music title name and the like to a label which is adhered to the compact disc.

Figure 2:
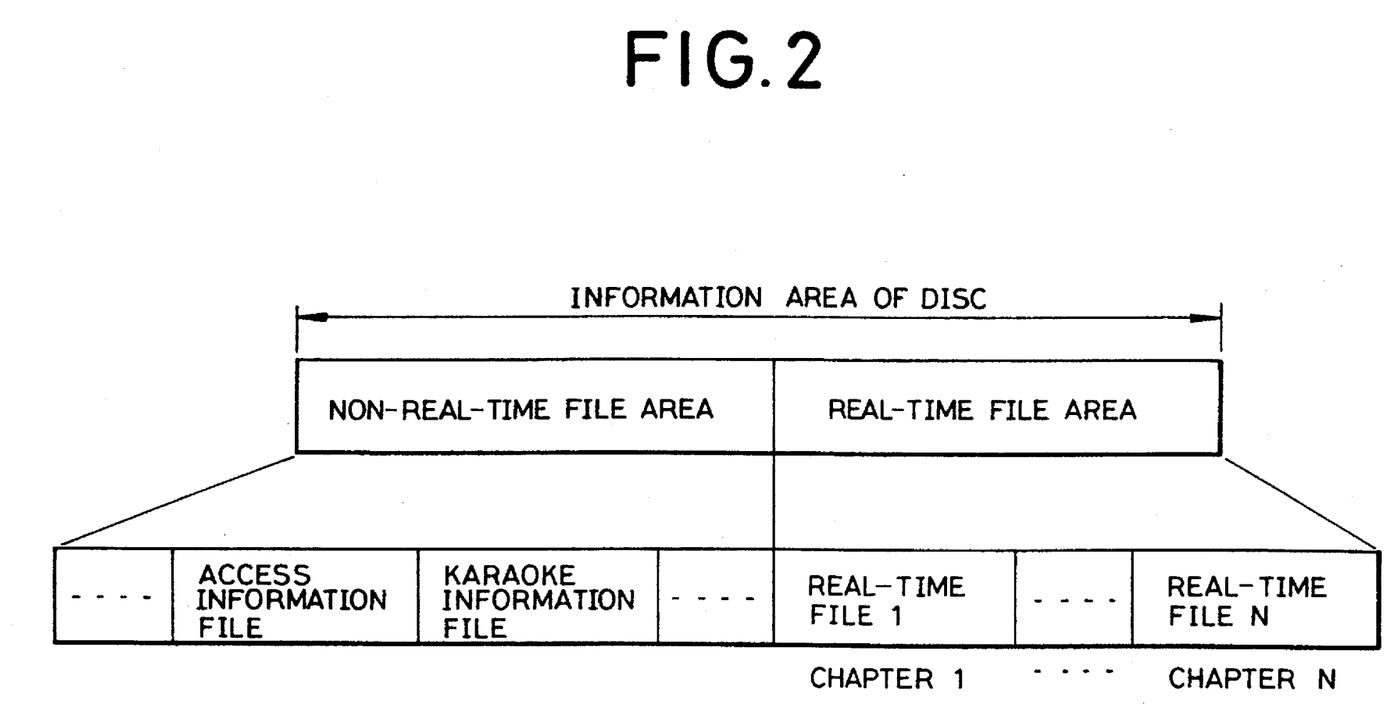
FIG. 2 is a diagram showing a construction of an information area of a disc.

The recording contents of the disc 5 which is played by the player section 4 will now be described. All of the information has been recorded as digital signals on the disc 5. As shown in FIG. 2, each information recording area of the disc 5 has a non-real-time file area and a real-time file area. An access information file such as TOC or the like and a Karaoke information file of the music title name and the like have been recorded in the non-real-time file area. N (N is an integer indicative of the number of music pieces) real-time files have been recorded in the real-time file area on the basis of, for example, the MPEG (Moving Picture Expert Group) standard. Each of the real-time files is called by a unit of "chapter". One chapter corresponds to one music piece. The real-time file of one chapter comprises: the compressive image data and compressive audio data of one music piece; and the real-time data for controlling the external apparatus. Those data are multiplexed by a time-sharing method and recorded in the file. In the real-time data, a degree of climax of the music piece is indicated by 16 stages and its start time and length are shown by a time unit (for example, frame unit).

Figure 3:
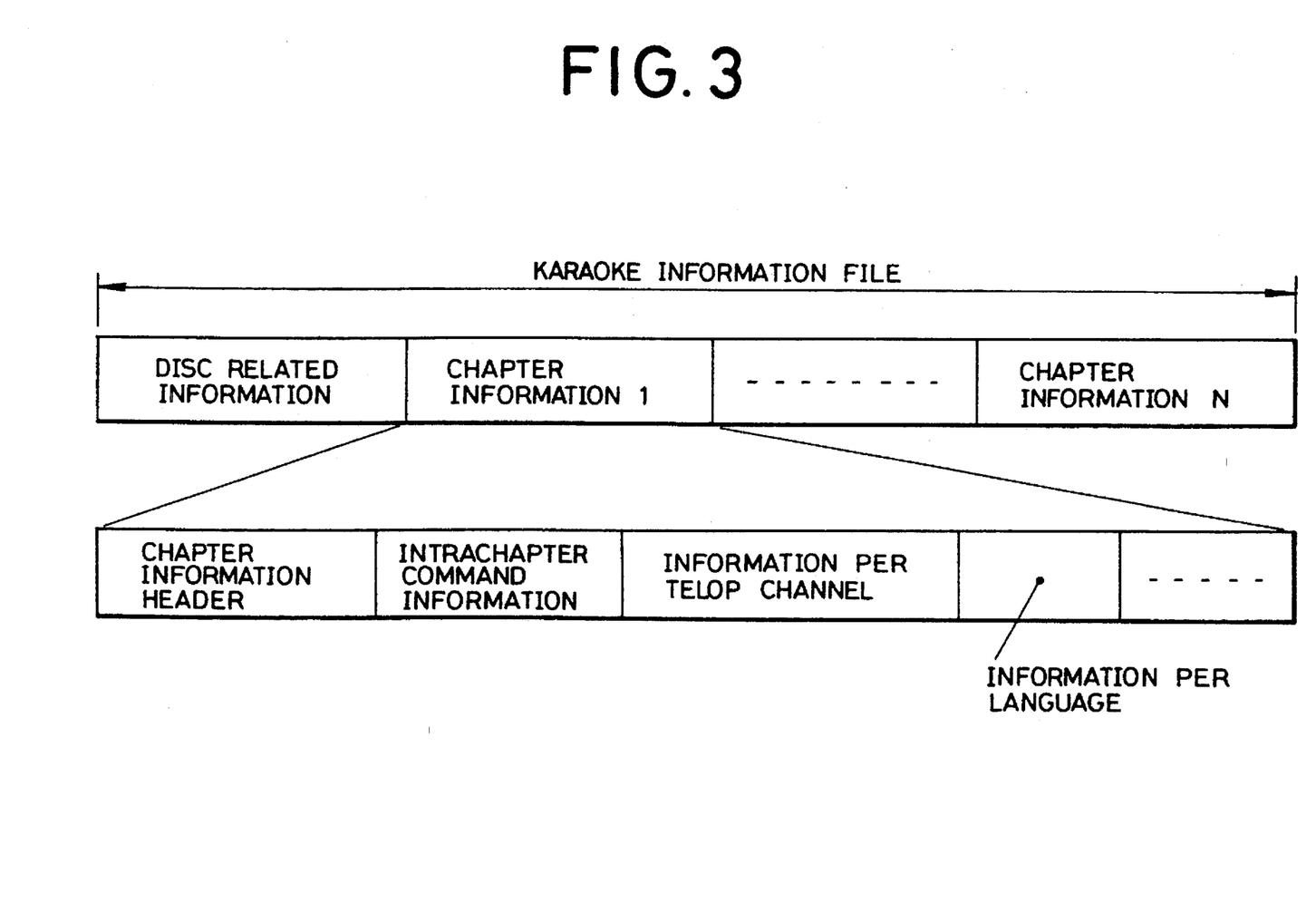
FIG. 3 is a diagram showing a construction of a Karaoke information file.

The access information file comprises information indicative of the position and time duration in the disc of each chapter and the like. By referring to such information, it is possible to access to an arbitrary chapter. The Karaoke information file comprises various information regarding the disc and music pieces. FIG. 3 shows a structure of the Karaoke information file. The Karaoke information file comprises disc related information and one or more chapter information. One chapter information indicates related information of one chapter, namely, music piece and the number of chapter information coincides with the number of music pieces. The disc related information is the information regarding the whole disc, for example, the information such as disc contents, identification of the disc itself, number of music pieces recorded on the disc, and the like.

Each chapter information includes a chapter information header, an intrachapter common information, information per telop channel, and information per language. The chapter information header comprises ID information of the chapter information, information indicative of the contents, and the like. The intrachapter common information comprises: (1) a nationality of the music piece; (2) year, month, and day of the publication of the music piece; 3) a length of music piece; (4) a copyright code; (5) a singer classification; (6) a genre of the music piece; (7) a main theme image of the music piece and a music piece theme; (8) a situation of the music piece; (9) a special genre of the music piece; (10) a tempo of the music piece; (11) a location image of the music piece; (12) a difficulty of the music piece; (13) a multiaudio mode; (14) background video image information; (15) control apparatus information; (16) DSP mode information; and the like.

The information per telop channel is the information regarding the character information (telop) corresponding to the chapter. A plurality of character information series (telop channels) can be allocated to one chapter. For example, telops of a plurality of different languages which can be selected can be added to one chapter. The information per telop channel includes various information such as (1) the number of telop channels, (2) a telop channel number, (3) a telop language, and (4) a character style of the telop. The various information such as telop channel number, telop language, and character style of the telop is repetitively recorded a number of times as many as only the number of telop channels.

The information per language is the information that depends on the language in the information about the chapter and comprises the following various information: (1) the number of information per language; (2) a language code; (3) a describing code system; (4) an information size per language; (5) a music title name; (6) reading of the music title name; (7) a name of singer; (8) reading of the singer name; (9) a name of songwriter; (10) reading of the songwriter name; (11) a name of composer; (12) reading of composer name; (13) the first phrase; (14) reading of the first phrase; (15) location data; and the like. The information from (2) language code to (15) location data is repetitively recorded a number of times as many as only the number of information per language.

The operation of the foregoing Karaoke reproducing apparatus will now be described.

Figure 4:
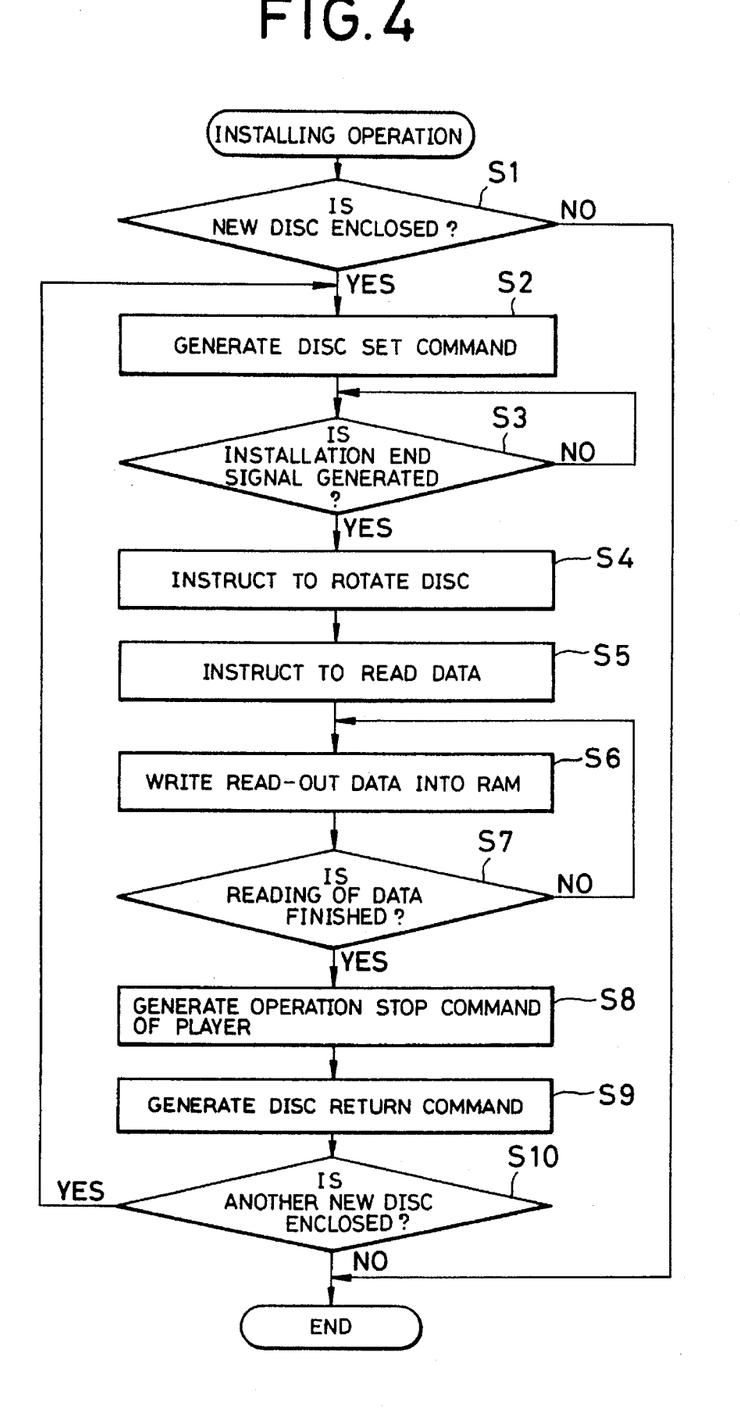
FIG. 4 is a flowchart showing the installing operation.

In the case where a disc is newly enclosed into the disc enclosing section 2 of the automatic changer 1, the installing operation is first performed. In the installing operation, when the new disc is enclosed into the disc enclosing section 2 as shown in FIG. 4, the system controller 7 detects that the disc has been enclosed (step S1). The system controller 7, therefore, generates a disc setting command to the disc conveying section 3 so as to put the disc onto the turntable of the player section 4 (step S2). When the disc conveying section 3 finishes to put the disc onto the turntable of the player section 4, such a state is supplied as a loading end signal to the system controller 7. The system controller 7, consequently, obtains the loading end signal (step S3). The system controller 7 instructs the player section 4 to rotate the disc (step S4) and instructs the reading of the data (step S5).

The player section 4 rotates the disc together with the turntable. After the rotational speed reached a predetermined rotational speed, the data is read out from the non-real-time file area of the disc and is generated. The read-out data is supplied to the system controller 7 through the data separating circuit 6 and is once stored into a buffer memory (not shown) in the system controller 7. The system controller 7 sequentially writes the supplied data into the external RAM 13 (step S6) and discriminates whether the data reading operation by the player section 4 has been finished or not (step S7). For example, until a bit indicative of the end of the data supply is supplied and the end of the data reading operation is known, the data supplied by the execution in step S6 is written into the RAM 13. When the data reading operation is finished, an operation stop command is generated to the player section 4 (step S8). A disc return command is generated to the disc conveying section 3 (step S9). The player section 4, consequently, stops the rotation of the turntable and, after that, the disc conveying section 3 conveys the disc on the turntable to a predetermined enclosing position of the disc in the disc enclosing section 2 and encloses it. After completion of the execution in step S9, the system controller 7 judges whether another new disc has been enclosed or not (step S10). If another new disc has been enclosed in the disc enclosing section 2, the processing routine advances to step S2. When none of the other new discs is enclosed, the installing operation is finished.

All of the data of each of the access information files and Karaoke information files can be written into the RAM 13. Since it is difficult to have a capacity enough to store all of the data, however, at least only the following information is stored: namely, a disc number peculiar to the disc; an address indicative of the enclosing position of the disc enclosing section 2 of the disc; a location in the disc of the music piece; a name of music piece; a name of singer; a name of songwriter; a name of composer; a length of music piece; a copyright code; background video image information; control apparatus information; DSP mode information; and the like.

Information indicating that a new disc has been enclosed can be derived by an input from the operating section 15. It is also possible to construct in the following manner. That is, a sensor to detect the presence or absence of the disc is attached at each enclosing position of the disc enclosing section 2. An area to store the result of the detection of the sensor is provided in the RAM 13. Each time the installing operation is executed, detection outputs of all of those sensors are compared with the memory contents in the RAM 13, thereby judging whether the new disc has been enclosed or not. The result of the detection is written into the RAM 13.

In the above embodiment, various information such as music piece data and the like is obtained together with the image data and audio data at the time of the installation of the recorded disc. The music piece data, however, can be also obtained at the time of the installation of the disc from an exclusive-use disc on which only such various kinds of information has been recorded. Or, it is also possible to construct in a manner such that various information of a plurality of discs on which image data and audio data have been recorded is recorded onto one of the plurality of discs and those various information is obtained at the time of the installation of such a special disc.

Figure 5:
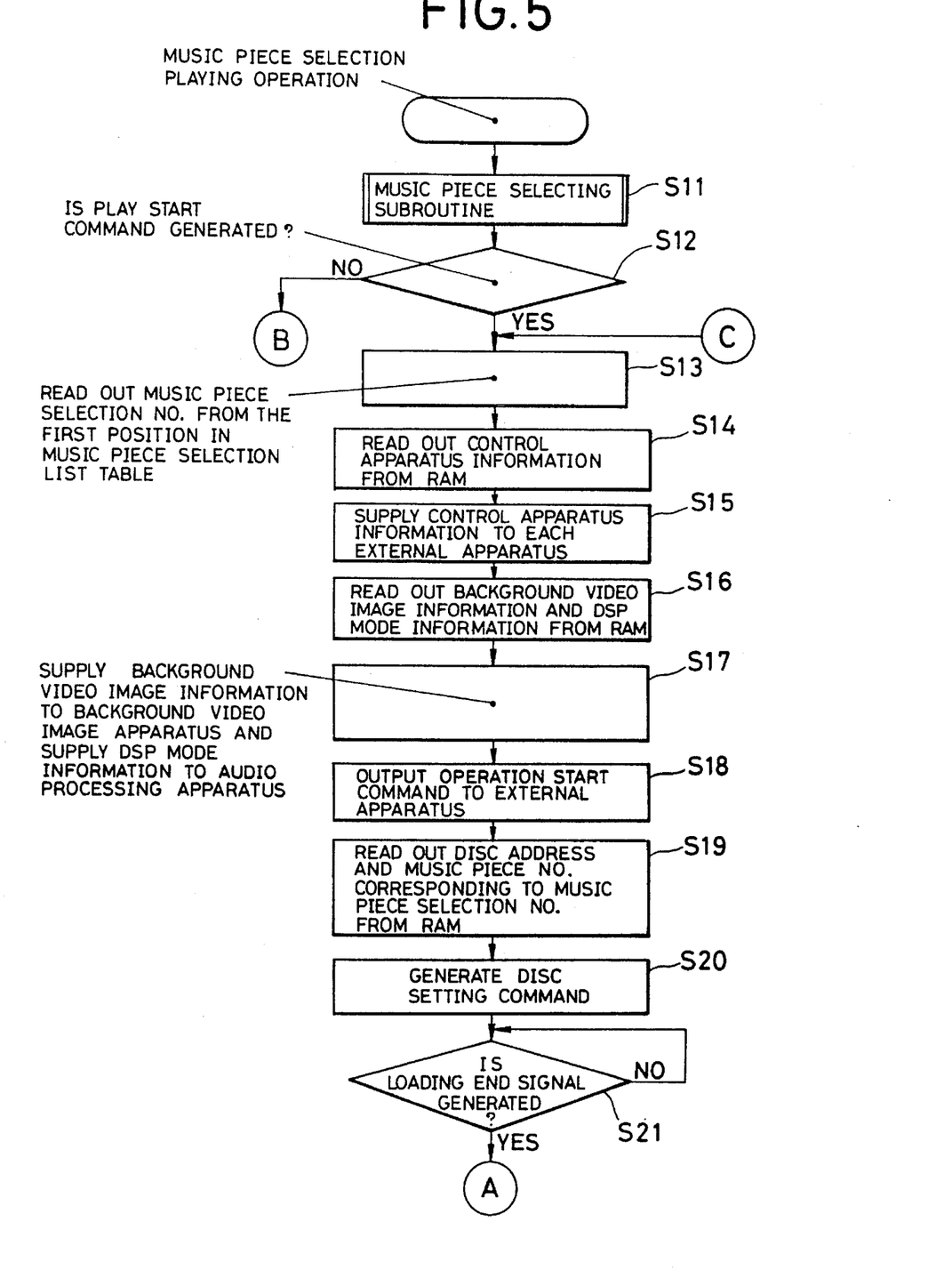
FIG. 5 is a flowchart showing the music piece selection playing operation.
Figure 6:
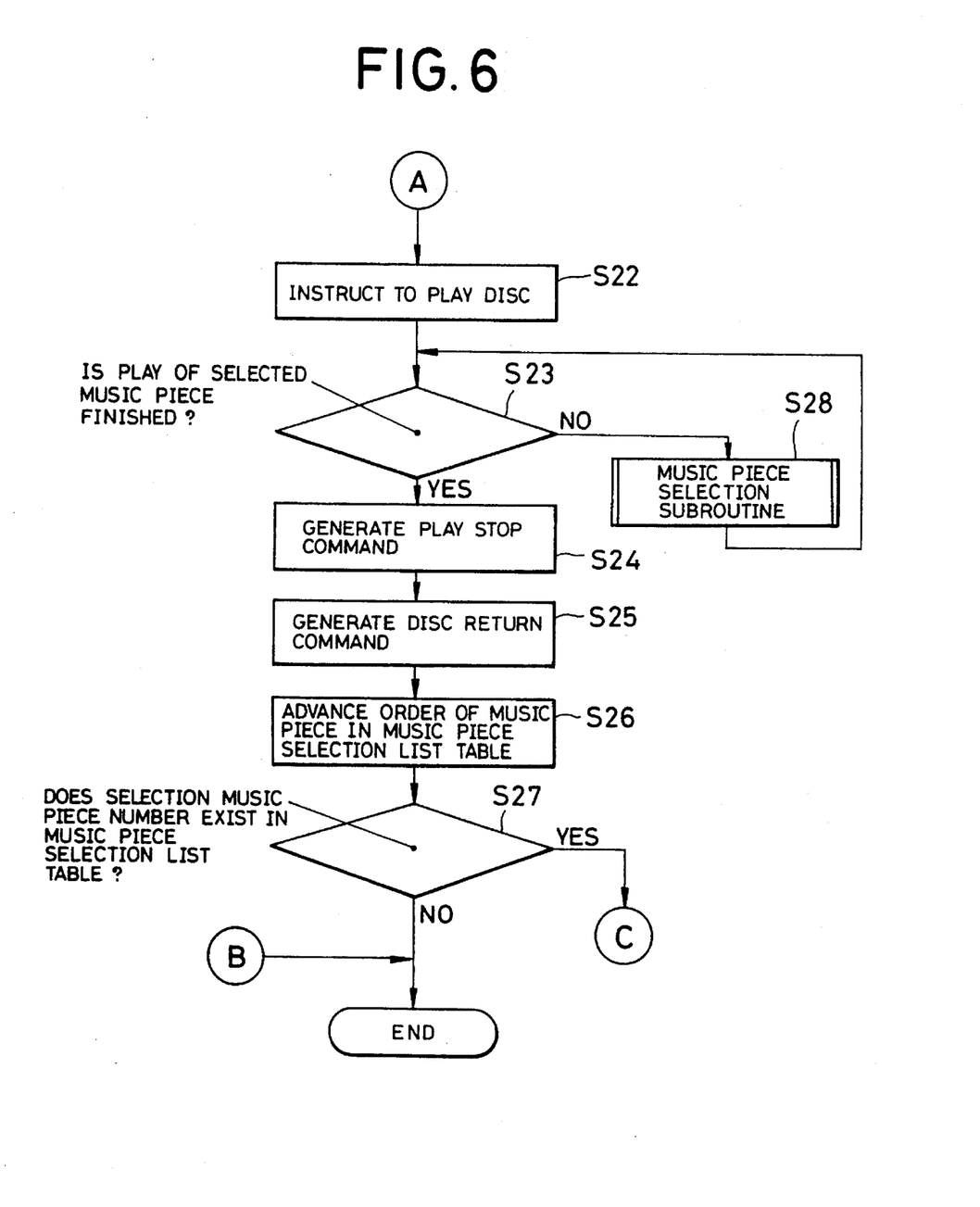
FIG. 6 is a flowchart showing a continuous portion of the music piece selection playing operation in FIG. 5.

After the installing operation was executed as mentioned above, the Karaoke reproduction regarding the music piece selected by the user can be performed. To execute the Karaoke reproduction, the music piece selection playing operation is repetitively executed in the system controller 7. The system controller 7 first executes a music piece selecting subroutine as shown in FIGS. 5 and 6 (step S11).

Figure 7:
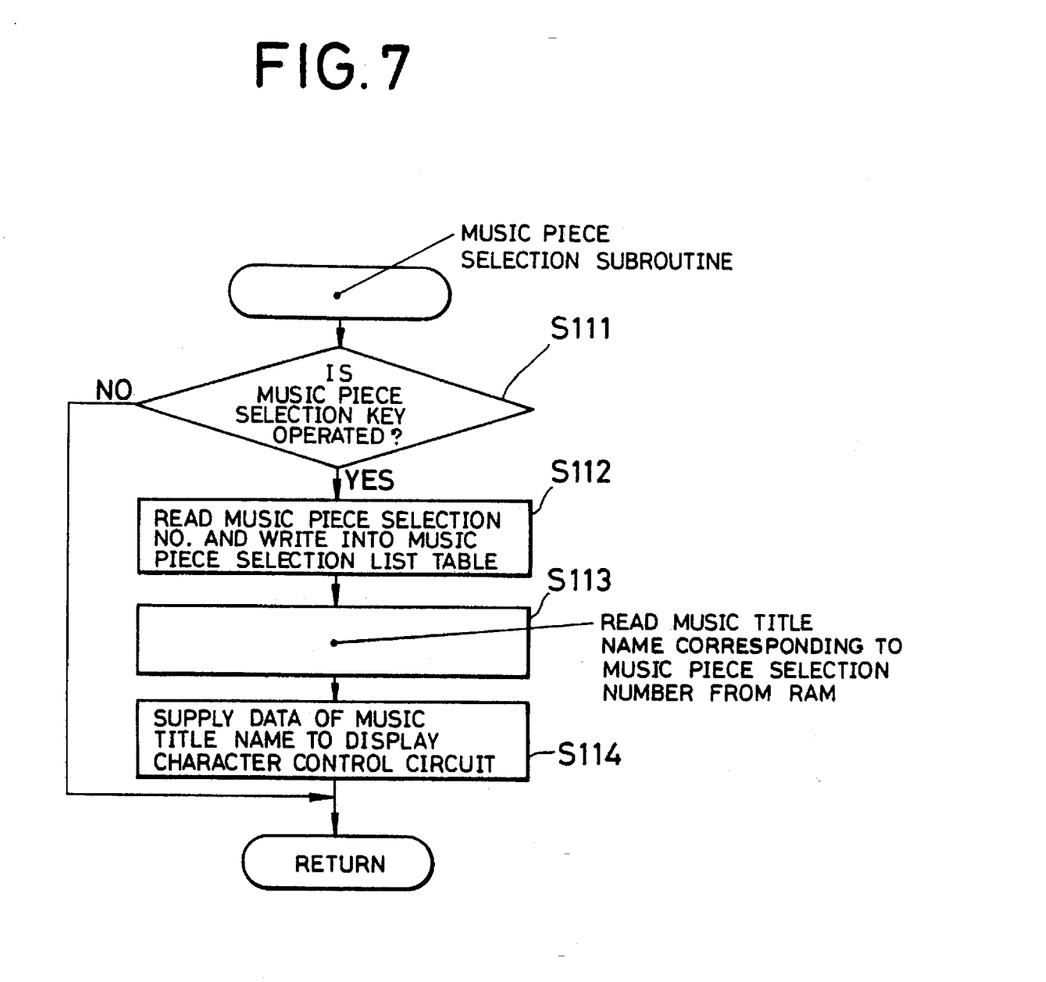
FIG. 7 is a diagram showing the operation by a music piece selecting subroutine.
Figure 8:
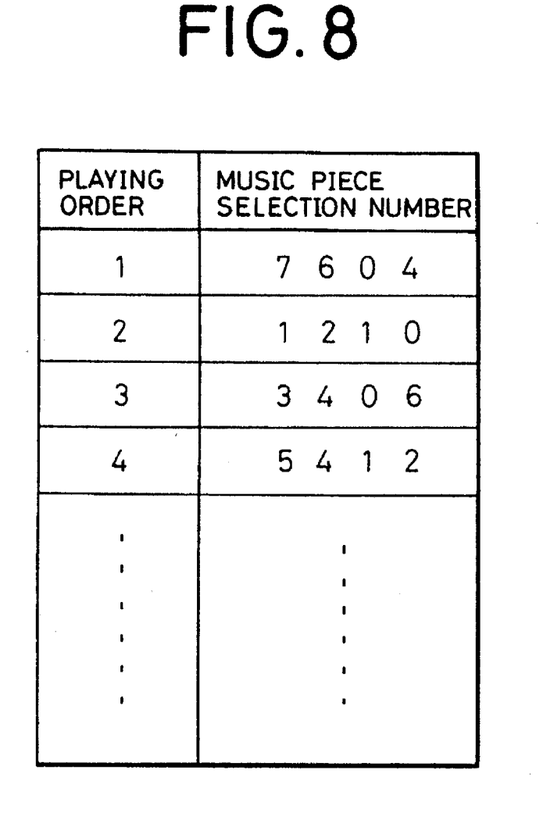
FIG. 8 is a diagram showing a music piece selection list table.

In the music piece selecting subroutine, the user designates a desired music piece selection number by operating numeral keys or alphabet keys of the operating section 15 or remote control transmitter 23. The music piece selection number comprises a plurality of digits and is the number to designate the disc and the music piece recorded in the designated disc. When the user operates the keys, the music piece selection number is held in a buffer (not shown) in the operating section 15. As shown in FIG. 7, the system controller 7 discriminates whether a music piece selection key (not shown) of the operating section 15 has been operated at a predetermined timing or by an interrupting operation or not (step S111). When the music piece selection key is operated, the music piece selection number is read out from the above buffer and is written into a music piece selection list table in the RAM 13 (step S112). The music piece selection list table is formed in the RAM 13 and the music piece selection numbers are sequentially written into the table in accordance with the playing order as shown in FIG. 8 and, when the playing operation is finished, the playing order is counted up. The music title name corresponding to the read-out music piece selection number is read out as information data from the RAM 13 (step S113). The readout data is supplied to the display character control circuit 20 (step S114). In the display character control circuit 20, the display character data indicative of the music title name is produced and is written at a predetermined location in the V-RAM. The display character data is read out from the V-RAM and is converted into the character video image signal. After that, the character video image signal is sent to the image synthesizer 21. When the character video image signal is the signal indicative of a predetermined color in the image synthesizer 21, it is generated in place of the moving image video signal from the D/A converter 12 and is synthesized to the moving image video signal. The music title name is, consequently, displayed as a character video image on the display 22 and the user can confirm that the selected music piece designated by the key operation has been accepted.

Figure 9:
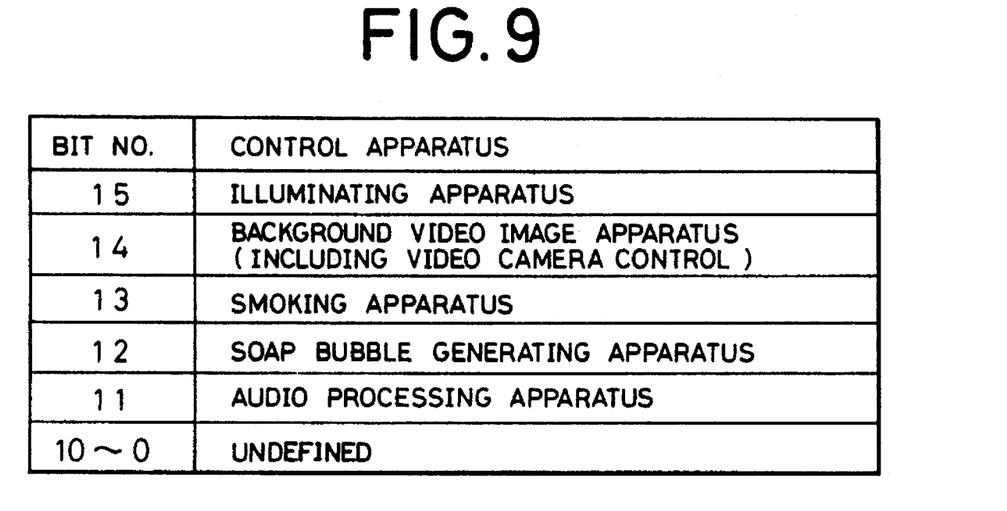
FIG. 9 is a diagram showing an example of control apparatus information.

After completion of the execution of the music piece selecting operation in step S11, when the start of the disc playing operation is instructed by the key operation of the operating section 15 (step S12), the system controller 7 sequentially reads out the music piece selection numbers from the first order of the playing order in the music piece selection list table formed in the RAM 13 (step S13). The control apparatus information corresponding to the read-out music piece selection numbers is read out from the RAM 13 (step S14) and is supplied to the external apparatuses (step S15). As shown in FIG. 9, one bit of the control apparatus information corresponds to one external apparatus and, when the value of bit is equal to "1", this means that the external apparatus corresponding to such a bit can be controlled. In the present apparatus, since the illuminating apparatus 25, background video image apparatus 26, and audio processing apparatus 27 are provided as external apparatuses, one-bit data corresponding to those external apparatuses is supplied. When the supplied 1-bit data is equal to "1", therefore, the external apparatus enters a set state in which it can be controlled in accordance with the real-time data.

After step S15 was executed, the system controller 7 reads out the background video image information and DSP mode information from the RAM 13 (step S16) and supplies the background video image information to the background video image apparatus 26 and supplies the DSP mode information to the audio processing apparatus 27 (step S17). In the background video image apparatus 26, the operating state is set in accordance with the supplied background video image information. That is, the background video image signal indicating which one of the background video images of the photographed video image of the singer or the like and the video image regarding the image, situation, location, season, and the like of the music piece should be generated is set. In the audio processing apparatus 27, a processing program of the DSP and data such as reverberation time, multiplication coefficients, and the like for sound field control are set in accordance with the DSP mode information. Such data is set to, for example, the values suitable for the selected music piece. Since the external apparatuses 25 to 27 are set into the operative mode when the supplied 1-bit data is equal to "1" by the above operations, the system controller 7 generates an operation start command to the external apparatuses 25 to 27 (step S18). The illuminating apparatus 25, therefore, starts the illumination in accordance with the own program in the set state and the background video image apparatus 26 starts the generation of the set background video image signal. The background video image according to the video image signal is displayed on the display 22. Until the audio signal of the selected music piece is reproduced and generated, the audio processing apparatus 27 supplies the special audio signal to the amplifier 18 from audio signal generating means (not shown). The reproduction sound of the special audio signal is generated from the speaker 19. The operations in the external apparatuses 25 to 27 are executed until the Karaoke play of the selected music piece is actually started and the real-time data is supplied.

The system controller 7 further reads out the disc address and music piece number corresponding to the read-out music piece selection number from the RAM 13 (step S19). The system controller 7 generates a disc setting command to the disc conveying section 3 in order to put the disc of the read-out disc address onto the turntable of the player section 4 (step S20). After the disc conveying section 3 finished the operation to put the disc onto the turntable of the player section 4, information indicative of such a state is supplied as a loading end signal to the system controller 7. When the system controller 7 obtains the loading end signal (step S21), therefore, the system controller 7 instructs to play the disc from the track of the read-out music piece selection number (step S22). The player section 4, thus, starts to play the music piece designated by the music piece selection number.

In the disc play, the data generated from the player section 4 is separated by the data separating circuit 6 and the compressive image data and the video image signal and audio signal reproduced from the compressive audio data are supplied to the display 22 and speaker 19. The real-time data separated by the data separating circuit 6 is supplied to the external apparatus control interfaces 30 to 32. Each of the interfaces 30 to 32 repetitively executes the same operation as follows.

Figure 10:
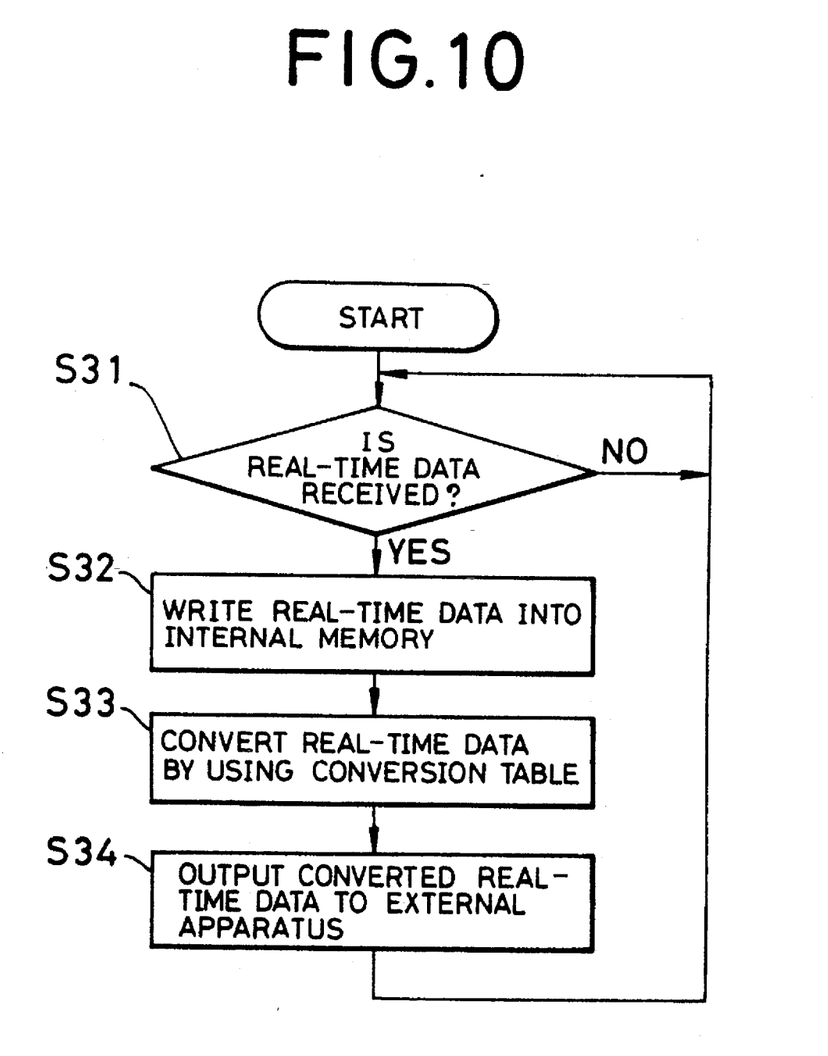
FIG. 10 is a flowchart showing the operation of an external apparatus control interface.

As shown in FIG. 10, a check is first made to see if the real-time data of a predetermined unit has been received or not (step S31). When the real-time data of the predetermined unit is received, it is written into the internal memory (step S32). The real-time data is converted by using the foregoing conversion table (step S33). The converted real-time data is supplied to the external apparatus (step S34). That is, with the interface 30, the real-time data is supplied to the illuminating apparatus 25. With the interface 31, the real-time data is supplied to the background video image apparatus 26. With the interface 32, the real-time data is supplied to the audio processing apparatus 27. Since the conversion tables in the interfaces 30 to 32 differ, the real-time data that is supplied to the external apparatuses 25 to 27 has the different contents.

In the case where the 1-bit data supplied in the control apparatus information is equal to "1" at the time of the operation in step S15, the illuminating apparatus 25 has already entered the setting state in which it can be controlled in accordance with the real-time data, the real-time operation in which the illuminance and color of the illumination change is performed in place of the operation before the above playing operation in accordance with the real-time data supplied from the interface 30. In the case where the supplied 1-bit data in the control apparatus information is equal to "1" at the time of the operation in step S15, the background video image apparatus 26 has already been set into the operating state in accordance with the background video image information by the operation in step S17. The contents and color of the background video image, therefore, change in place of the operation before the playing operation in accordance with the real-time data supplied from the interface 31. In the case where the supplied 1-bit data in the control apparatus information is equal to "1" at the time of the operation in step S15, the audio processing apparatus 27 has also already been set into the sound field control state in accordance with the DSP mode information by the operation in step S17. The generation of the special audio signal before the playing operation, therefore, is stopped in accordance with the real-time data supplied from the interface 32. For example, further, a tone and a sound volume of the singing sound change.

In the case where the supplied 1-bit data in the control apparatus information is equal to "1", each of the illuminating apparatus 25, background video image apparatus 26, and audio processing apparatus 27 operate in accordance with its own program. In this case, the illuminating apparatus 25 or the like can also operate in accordance with the Karaoke playing sound.

After completion of the execution in step S22, the system controller 7 judges whether the play of the selected music piece has been finished or not (step S23) from the time information in the control data that is supplied from the data separating circuit 6 by the play of the disc. When the play of the selected music piece is not finished, the music piece selecting subroutine is executed (step S28). The discriminating process in step S23 is repeated. The music piece selecting subroutine is substantially the same as the operation shown in FIG. 7 mentioned above and enables the music piece selection to be accepted during the Karaoke reproduction. When the play of the selected music piece is finished, a play stop command is generated to the player section 4 (step S24). A disc return command is generated to the disc conveying section 3 (step S25). The player section 4 stops the disc playing operation. After the rotation of the turntable was stopped, the disc conveying section 3 conveys the disc on the turntable to a predetermined enclosing position of the disc in the disc enclosing section 2 and encloses there. After the disc return command was generated, the system controller 7 increases the order of the music piece in the music piece selection list table by one (step S26) and judges whether the music piece selection number has been recorded at the first position in the music piece selection list table or not (step S27). If the music piece selection number has been recorded, the processing routine is returned to step S13 and the above operations are repeated. When the music piece selection number is not recorded, on the contrary, the playing operation is finished.

In the above embodiment, by supplying the operation start command from the system controller 7 to the external apparatuses 25 to 27, each of the external apparatuses 25 to 27 independently operates before the Karaoke play is started. It is, however, also possible to immediately start the operation when the supplied 1-bit data in the control apparatus information is equal to "1" at the time of the operation in step S15. In the above embodiment, after the start of the Karaoke play, the external apparatuses 25 to 27 operate in accordance with the real-time data. The operation before the Karaoke play, however, can be also continued as it is.

In the above embodiment, each of the external apparatus control interfaces 30 to 32 merely converts the real-time data in accordance with the conversion table. It is, however, also possible to construct in the following manner. Namely, the information such as genre, tempo, season, theme of the music piece, situation, district, and the like of the music piece in the intrachapter common information read out from the non-real-time file area or the control information area in the real-time file area is supplied to the external apparatus control interfaces 30 to 32 by the system controller 7. Each of the external apparatus control interfaces 30 to 32 converts the real-time data on the basis of the conversion table and the information from the system controller 7.

In the present invention, it will be obviously understood that the recording medium on which at least the Karaoke playing sounds of a plurality of music pieces have been recorded is not limited to the disc but any other recording media such as a tape and the like can be also used.

Although the invention has been described with respect to the case of reproducing the medium on which the information that was image compressed by the MPEG or the like has been recorded, the invention is not limited to such a case. A similar effect can be also obtained so long as a medium to which control information for controlling the external apparatus can be added.

According to the Karaoke reproducing apparatus of the invention as mentioned above, the control information of a plurality of music pieces is previously reproduced from the recorded information on the recording medium by the reproducing means and is stored into the memory means. When one of the plurality of music pieces is selected by the operation, the control information corresponding to the selected music piece is read out from the memory means and is supplied to the external apparatus to thereby start the operation. After that, the recording medium is played with respect to the selected music piece and the reproduction of the Karaoke playing sound is started. After one Karaoke play was finished, therefore, the external apparatus starts the operation according to the next Karaoke playing music piece before the next Karaoke playing sound is actually generated. The image of the selected music piece to be subsequently played is expressed by the external apparatus, so that a show up effect such that an expectation feeling is raised or the like can be derived.

What is claimed is:

1. A Karaoke reproducing apparatus for reproducing a Karaoke playing sound and controlling an external apparatus, comprising:

a recording medium having recorded information thereon, the recorded information including at least Karaoke playing sounds of a plurality of music pieces and control information, for said external apparatus, for every one of said plurality of music pieces;

reproducing means for reading out the recorded information from said recording medium and for reproducing the information that is read out;

memory means having previously stored control information from the recording medium therein;

means for generating a music piece selecting command indicative of one of said plurality of music pieces in accordance with an operation; and control means for reading out the previously stored control information for said one music piece from said memory means according to said music piece selecting command, for supplying said read out control information to said external apparatus before said reproducing means begins to play said recording medium for reproducing said one music piece according to the music piece selecting command, and subsequently instructing said reproducing means to play said recording medium for reproducing said one music piece according to the music piece selecting command.

2. A reproducing apparatus comprising:

a plurality of recording units having recorded information thereon, the recorded information including music pieces and individual control information for each of the respective music pieces;

means for removably receiving the recording units;

means for reading the control information when the recording units are inserted into the means for removably receiving;

a memory for storing the control information when it is read by the means for reading;

means for selectively playing the recording units and selectively playing the music pieces on the recording units; and control means for reading out previously stored control information from the memory for a first music piece selected to be played on a first one of the recording units and supplying the read out control information to an external apparatus before the playing means begins to play the recording unit having the selected music piece thereon.

3. An apparatus as in claim 2 wherein the control means reads out previously stored control information from the memory for a second music piece selected to be played on a second one of the recording units and supplies the stored information to the external apparatus while the means for selectively playing physically exchanges the second recording unit for the first recording unit at a playing position in the means for selectively playing.

* * * * *